June 27, 1961  D. F. HOWARD ET AL  2,990,353
NUCLEAR REACTOR CONTROL SYSTEM
Filed March 1, 1954  2 Sheets-Sheet 1

INVENTORS.
DONALD F. HOWARD
ERCOLE E. MOTTA
BY
William R. Lane
ATTORNEY

INVENTORS.
DONALD F. HOWARD
ERCOLE E. MOTTA
BY William R. Lane
ATTORNEY

2,990,353
// NUCLEAR REACTOR CONTROL SYSTEM
// Donald F. Howard and Ercole E. Motta, Long Beach, Calif., assignors, by mesne assignments, to the United States of America as represented by the United States Atomic Energy Commission
// Filed Mar. 1, 1954, Ser. No. 413,384
// 2 Claims. (Cl. 204—193.2)

This invention relates to the control of thermal nuclear reactors, and particularly to a control system utilizing unique control by neutron absorbing elements for continuously maintaining the power level of a nuclear reactor at a preset value without material perturbations in the neutron flux field of the reactor.

The core of a nuclear reactor contains an above-critical mass of fissionable material. The excess reactivity resulting from this excess mass is counteracted by the insertion of one or more control rods into or near the core. These control rods are constructed of a good neutron absorbing material, such as boron, gadolinium, or cadmium. They normally absorb a sufficient number of thermal neutrons to reduce the multiplication factor of the reactor to unity at the desired power level. However, as a result of fuel burn-up and the neutron absorbing characteristic of the products of fission, there must be a continuous, or at least a periodic, adjustment of the number of neutrons absorbed by the control rods. If this adjustment is not made, the multiplication factor of the reactor decreases below unity and the reactor eventually shuts down.

In the past, the control rods have been progressively withdrawn a slight amount to thereby decrease the amount of boron or cadmium in the core. The partial insertion and the adjustments in the depth of insertion of the control rods caused serious perturbations in the neutron flux distribution. These perturbations were particularly undesirable in reactors of small physical size since they resulted in a decrease in the average to peak power ratio. In addition, localized heating occurred at various points in the reactor as a result of the non-uniformities of the neutron flux distribution. The distribution of the neutrons in the core is affected by many factors. One of the major causes of non-uniformity, however, is the non-homogeneous distribution of the neutron absorbing material in the core. This cause of non-uniformity was accentuated by the partial removal of the control rods containing the neutron absorbing material. When the control rods were positioned vertically and were 50 percent withdrawn, the poison (neutron absorbing material) of the rods was concentrated in the upper half of the core. This necessarily resulted in a high neutron density in the lower half, with a low neutron density in the upper half of the core.

It is therefore an object of this invention to provide a new and improved control rod for controlling the power level of a thermal nuclear reactor.

It is another object of this invention to provide an improved control unit characterized by an adjustable neutron absorbing efficiency.

It is a further object of this invention to provide an improved control unit useful for controlling the power level of a thermal nuclear reactor utilizing means for electroplating, at a controlled rate, a thin layer of a good neutron absorbing material between a large surface area electrode and a small surface area electrode.

It is another object of this invention to provide a control unit for controlling the power level of a thermal nuclear reactor comprising two concentric tubes, a thin layer of a good neutron absorbing material plated in a predetermined pattern on the inner surface of the outer tube, means for electroplating said layer between said tubes, and means for inserting and removing said concentric tubes from said nuclear reactor.

It is a further object of this invention to provide an improved control system for controlling the power level of a thermal nuclear reactor.

It is another object of this invention to provide a control system for thermal nuclear reactors including a control unit with an adjustable neutron absorbing efficiency positioned within the effective neutron flux field of the core of said reactor and means for varying the efficiency of said control unit in response to changes in the power level of said reactor to maintain said power level at a preset value.

It is a further object of this invention to provide an improved control system for controlling the power level of a thermal nuclear reactor comprising at least two control units characterized by an adjustable neutron absorbing efficiency; means for adjusting the neutron absorbing efficiency of said control units; means for generating outputs which are predetermined functions of the neutron absorbing efficiency of said control units; means for alternately positioning said control units in the effective neutron flux field of the core of said reactor; means for actuating said positioning means when the efficiency of the control unit positioned in the field decreases to a predetermined value; a plurality of shim rods positioned in said neutron flux field; and means for removing at least one of said shim rods each time said control unit positioning means is actuated.

Other objects of invention will become apparent from the following description taken in connection with the accompanying drawings, in which FIG. 1 is a section view of a preferred embodiment of the control unit contemplated by this invention;

FIG. 6 is a section view of a modification of the outer electrode of the control unit of FIG. 1; and FIG. 7 is a section view of an alternate modification of the outer electrode of the control unit of FIG. 1.

Figure 1:
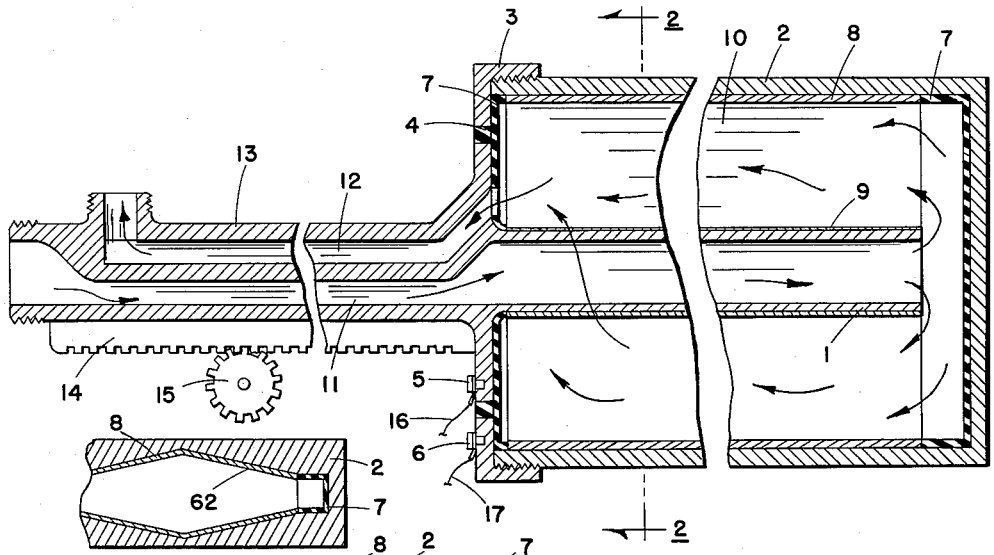

Before describing the construction and operation of the preferred embodiments of this invention, a brief discussion of theory and definition of terms follows. Nuclear reactors are constructed with a core containing an above-critical mass of fissionable material and a suitable moderator. The core is usually surrounded by a reflector which serves to reflect back into the core some neutrons which would otherwise escape. Some of the neutrons in the reflector are thus available for the fission process. As a result of the excess reactivity of the core caused by the excess mass of fissionable material, more neutrons are produced at any given instant than are needed to support a predetermined rate of fission plus normal losses. It is therefore necessary to insert a poison or good neutron-absorbing material into the effective neutron flux field of the core in order to remove, by absorption, the excess neutrons. The effective neutron flux field is that region including the core and immediate surroundings in which there is an appreciable number of neutrons in a position to subsequently cause further fission. A poison inserted in this region therefore affects the fission rate. By appropriate regulation of the effective amount of poison in the region, the multiplication factor of the reactor is made unity.

The ability of a given material to absorb neutrons is measured by its microscopic absorption cross-section, $\sigma_a$. As is well known, the cross-sections of the various nuclides vary over wide ranges from a fraction of a millibarn to hundreds of thousands of barns. It is to be noted that, in general, the absorption cross-section is also dependent on the energy of the incident neutron. Thus, natural cadmium and boron contain nuclides which have good absorption cross-sections for neutrons in the thermal energy range. Therefore, these materials are frequently used for absorbing the excess neutrons in thermal nuclear reactors. Within limits, the thickness of a plate of neutron absorbing material determines what percentage of the total incident neutrons entering the plate are absorbed. This characteristic of the plate, i.e., the percentage of thermal neutrons absorbed, per total incident thermal nuertons, is defined as its thermal neutron absorbing efficiency. This absorbing efficiency varies with thickness according to an exponential curve. For the purposes of this application, when a plate of the neutron absorbing material is sufficiently thick to absorb approximately 99% of incident thermal neutrons, it is considered "black" to thermal neutrons. The minimum thickness of the plate capable of absorbing this percentage of neutrons is called the "black thickness." For example, a natural cadmium plate .015 inch thick absorbs approximately 99% of the thermal neutrons entering one side. Therefore, the black thickness for natural cadmium is .015 inch. It is to be noted that although some of the control rods in the past have been constructed of solid cadmium, a cadmium shell having the same external dimensions and a shell thickness of .0075 inch has substantially the same thermal neutron absorbing efficiency, i.e., 99%. Since any thermal neutron entering the rod must pass through two layers of the shell, before reentering the core, it is only necessary to make the shell thickness one-half the black thickness for cadmium.

Figure 2:
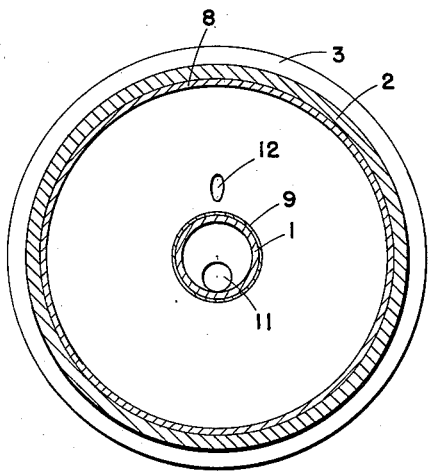
FIG. 2 is a section view of the control unit of FIG. 1, taken along the line 2—2.

Referring now to FIGS. 1 and 2, a preferred embodiment of the control unit having an adjustable thermal neutron absorbing efficiency is shown. Inner tube 1 is maintained concentric in can 2 by cap 3. Tube 1 is electrically insulated from can 2 by insulating ring 4. Terminals 5 and 6 are provided in cap 3 for making electrical connections with tube 1 and can 2, respectively. Thin layers 7 of insulating material are coated on those portions of can 2 and tube 1 where subsequent electroplating is not desired. Comparatively thick layer 8 of a good neutron absorbing material, such as cadmium, is initially plated on the inner surface of can 2. Thin layer 9 of the same neutron absorbing material is initially plated on the outer surface of tube 1. The exact thickness of layer 9 on tube 1 is not material since it serves merely as a convenient base for subsequent electroplating. The thickness of layer 8, however, is preferably made equivalent to or less than half the black thickness of the neutron absorbing material. For cadmium with a black thickness of .015 inch, this thickness is .0075 inch or less. The annular chamber between tube 1 and can 2 is filled with electrolytic solution 10 which is preferably a cadmium sulfate solution in pure water. To prevent accumulation of gas bubbles in this annular chamber, the preferred embodiment utilizes a continuous recirculation of solution 10 through ducts 11 and 12 in supporting member 13. Rack 14 is provided on support 13 for the purpose of positioning the control unit in a nuclear reactor in response to the rotation of gear 15.

In operation, the adjustment of the thermal neutron absorbing efficiency of the control unit of FIGS. 1 and 2 is accomplished by electroplating the cadmium layers between the two electrodes. The rate of electroplating is controlled by controlling the direction and magnitude of current flowing from a source (such as powerstat 32 controlled by thermopile 29 shown in FIGS. 4 and 5) of electrical power connected by wires 16 and 17 to the electrodes through terminals 5 and 6. Thus, if wire 16 is grounded, wire 17 is connected via current integrator 33 to wiper 54 in FIG. 5. It is noted, as discussed above, that a .0075 inch cadmium layer 8 on can 2 results in a thermal neutron absorbing efficiency for the control unit of approximately 99%. This means that approximately 99% of the thermal neutrons entering the control unit are absorbed by the cadmium. Assume can 2 has an inside diameter of 3 inches while tube 1 has an outside diameter of one-half inch. If now all of the cadmium in layer 8 is transferred by electroplating to layer 9 on inner tube 1, the efficiency of the control unit as a thermal neutron absorber decreases to approximately one-fifth its original value. The ratio of efficiencies is roughly proportional to the ratio of surface areas. Thus, the maximum and minimum thermal neutron absorbing efficiencies of the control unit are approximately 99% and 20%, respectively. Intermediate values between these two efficiencies are readily obtainable by controlling the thickness of cadmium layer 8 on can 2.

Although a preferred embodiment of the control unit contemplated by this invention has been described in detail, this invention is not to be limited to the particular configuration or materials described. As an example, other materials having a good neutron absorption cross-section, such as boron, or gadolinium can be substituted for the cadmium. Further, the two electrodes need not be positioned concentrically. They can be spaced in any desired manner as long as one of the electrodes has a materially larger plating surface area than the other electrode. Thus, two electrode rods having different outside diameters and a thin layer of cadmium can be placed side by side in an electrolytic bath in the control unit. The neutron absorbing efficiency of the control unit is then decreased by electroplating the cadmium from the large electrode rod to the small electrode rod.

It is frequently desired to predeterminately vary the relative amounts of neutron absorbing material in the various parts of a reactor core. A nuclear reactor, with a core in which the fissionable material is substantially uniformly distributed in the moderator, normally has a much greater neutron density near the center of the core than near the edges. If the amount of neutron absorbing material is made greatest near the center of the core, the uniformity of the neutron density throughout the core is greatly improved. The control system and control unit contemplated by this invention is uniquely adapted to accomplish this planned distribution of the poison.

Referring to FIGS. 6 and 7 section views of modified forms of the outer electrode of the control unit of FIG. 1 are shown. For purposes of illustration, the shapes of the portions of the control units shown are greatly distorted. Both electrodes attain the predetermined relative distribution of the cadmium by a variation in the surface area of the plating. In FIG. 6 this area is varied by tapering inner surface 62 of the electrode. In FIG. 7 tapered strips 63 of insulating material prevent electroplating on a portion of the inner surface of the electrode. Thus, the relative amounts of neutron absorbing material is varied in a predetermined manner along the entire length of the control unit. Since the control unit is not moved in an axial direction, the poison distribution remains optimum for the entire period of control. It is to be noted that past control rods which were axially moved during the controlling operation, could be made with an optimum distribution for only one depth of insertion.

Figure 3:
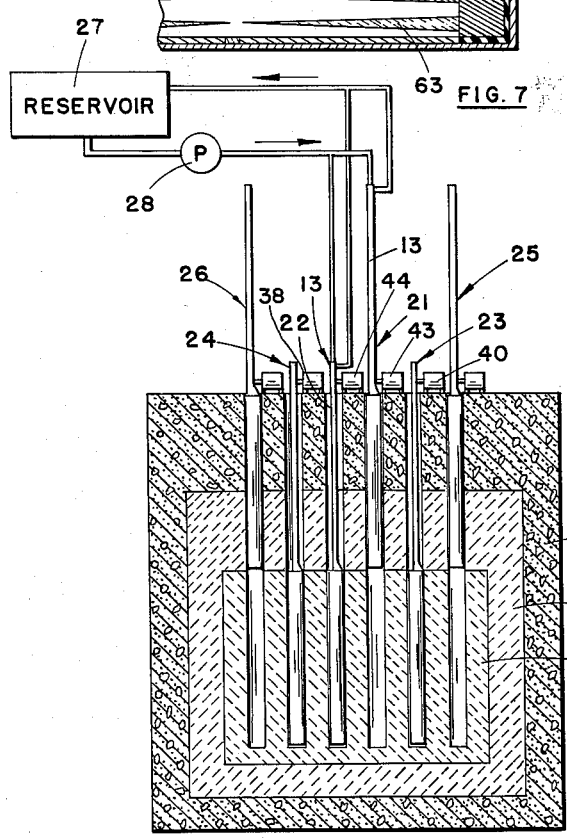
FIG. 3 is a view, partly schematic, of a typical reactor utilizing two of the control units of FIG. 1.

The control unit with an adjustable neutron absorbing efficiency, described above, is particularly useful for continuously and automatically maintaining the power level of a nuclear reactor at a preset value. Referring now to FIG. 3, a section view of a nuclear reactor is shown. For clarity, the relative sizes of the various components are distorted. The major reactor components are core 18, reflector 19 and shield 20. The control system for this reactor consists of start-up control rods, a plurality of shim rods for coarse control during operation and at least two control units for fine control over the power level during operation. Control units 21 and 22 are constructed similar to the above described control unit with adjustable neutron absorbing efficiency. One of these control units is initially positioned in the core while the other is initially positioned outside the core. Two coarse control shim rods 23 and 24, as well as two start-up control rods 25 and 26, are shown. Reservoir 27 containing the electrolytic solution is connected by appropriate piping to control units 21 and 22 through pump 28. The piping between reservoir 27 and control units 21 and 22 is preferably constructed of flexible tubing to permit the vertical movement of the control units. The electrolytic solution is therefore continuously recirculated between the electrodes of both control units. The direction of solution flow is shown by the arrows in FIG. 3. Start-up control rods 25 and 26 are normally inserted into the effective neutron flux field of core 18 only during start-up, shut-down or during a major change in the power level of the reactor. During normal operations they are completely removed from the field. Therefore, the power level of the reactor during normal operation is controlled by adjustments to the positions and neutron absorbing efficiencies of the control units and the shim rods. It is desired to effectuate this control without utilizing a partial removal of any control unit or shim rod.

Figure 4:
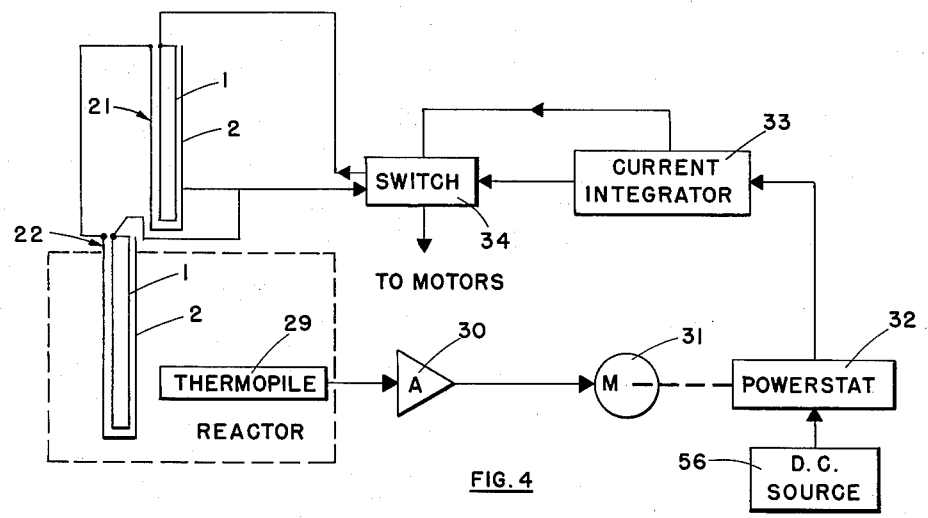
FIG. 4 is a block diagram of a preferred servo system utilized to adjust the neutron absorbing efficiency of the control units in the reactor of FIG. 3.

Referring now to FIG. 4, a block diagram of a closed servo loop for maintaining the power level of the nuclear reactor at a preset value by continuously adjusting the neutron absorbing efficiency of a control unit is shown. Neutron thermopile 29 is positioned to produce an output signal which is a function of the neutron density in the reactor which in turn is a function of the power level of the reactor. This output signal is coupled through amplifier 30 to motor 31. If the power level differs from a preset value, motor 31 is actuated to change the setting of powerstat 32 to thereby cause a plating current to flow through control units 21 and 22. The direction and magnitude of this plating current is controlled to return the power level to the desired value. The plating current accomplishes this change in power level by changing the thickness of the cadmium plating on the large surface area electrode. Current integrator 33 provides an output which is a continuous indication of the neutron absorbing efficiency of the control units. It is to be noted that control units 21 and 22 are preferably connected in series but in opposite polarity. Thus while the absorbing efficiency of control unit 22 is decreasing, the absorbing efficiency of control unit 21 is increasing at the same plating rate. Therefore when the efficiency of control unit 22 reaches a predetermined minimum value, the efficiency of control unit 21 reaches a predetermined maximum value. At that moment current integrator 33 actuates step switch 34 to interchange control units 21 and 22 and to reverse the direction of the plating current in the control units. Simultaneously, one of the shim rods is removed.

Figure 5:
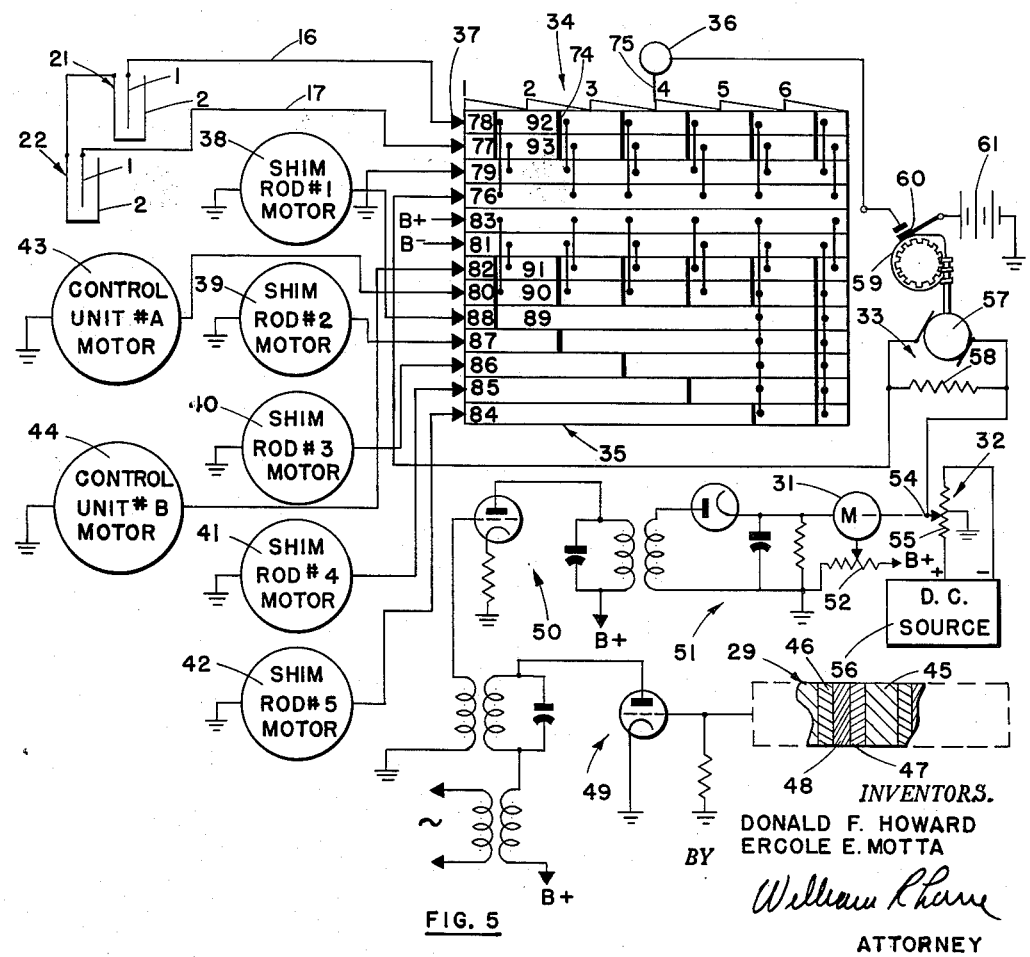
FIG. 5 is a schematic diagram of the circuit utilized to regulate the plating rate in the control units and the positions of the control units and shim rods in the preferred embodiment of the control system for a nuclear reactor contemplated by this invention.

Referring now to FIG. 5 a detailed circuit diagram of a switching arrangement used in the control system contemplated by this invention is shown. Cylindrical drum switch 35, actuated by step motor 36, is constructed with six positions. Drum switch 35 is constructed in the shape of a right circular cylinder rotatable about shaft 75 by step motor 36. These provide for six distinct interconnection arrangements between the component parts of the control system. Drum switch 35, shown in position #1, is composed of a plurality of insulated strips of conductive material, such as strips 76 and 83, some of which are further divided into insulated segments. In FIG. 5, the horizontal lines on drum switch 35 as well as the vertical lines, such as line 74, indicate electrical insulating material. Electrical interconnections between the strips are indicated by the heavy lines and dots on the face of drum 35. Drum 35 is indicated as a flattened plate in the figure to facilitate explanation.

Brushes 37 are provided to make electrical contact with the strip segments. The step feature of step switch 34 is schematically indicated by the saw tooth wave form on the top of drum switch 35. The brushes are shown as making contact to the appropriate segments while step switch 34 is in position #1. Actuation of step motor 36 via integrator 33 causes drum switch 35, which, as noted above, is cylindrical in shape, to rotate 60° to position #2. At that time, the brushes make contact with the segments which are directly beneath the indicated #2 position.

For purposes of illustration, it is assumed that the reactivity of the reactor is controlled by five shim rods and two control units. The insertion or removal of the shim rods and control units from the core is accomplished by individual D.-C. motors 38 through 44 through a rack and gear arrangement similar to that shown in FIG. 1. When one of these motors is connected to a source of voltage of a given polarity, it is assumed that the corresponding control element is withdrawn from the core. Conversely, a source of voltage of the opposite polarity connected to the same motor causes the motor to insert the control element into the core. The switching operation, as will be explained later, results in the removal of one shim rod and a control unit having a predetermined minimum absorbing efficiency while simultaneously inserting a control unit having a predetermined maximum absorbing efficiency. Since no change in the reactivity of the reactor is to result from this switch-step, the shim rods are designed with one shim rod and one minimum efficiency control unit having the same total effect on the reactivity of the reactor as one maximum efficiency control unit.

Thermopile 29, which is positioned in the neutron flux field of the reactor, preferably consists of a plurality of neutron sensitive thermocouples connected in series and separated by metal spacers 45. Each thermocouple consists of dissimilar thermoelectric metal layers 46 and 47, which may be bismuth and antimony, separated by layer 48 containing a neutron-flux-to-heat converting material such as boron or lithium. Thermopile 29 produces a small D.-C. voltage output as a function of the neutron density. This D.-C. output is amplified by utilizing modulator 49, amplifier 50 and demodulator 51. The output of demodulator 51 is a D.-C. voltage the magnitude of which is determined by the power level of the reactor. This voltage is compared to the voltage picked off by the wiper of power level potentiometer 52. The position of the wiper on potentiometer 52 is manually set to correspond to the desired power level. If the power level of the reactor falls below this preset value, the output voltage of demodulator 51 is less than the voltage from the wiper on potentiometer 52. Motor 31 is driven by this difference in potential to change the setting of wiper 54 on powerstat potentiometer 55, which is connected across D.-C. source 56. The setting of wiper 54 on potentiometer 55 determines the polarity and magnitude of the plating current.

The plating current flows through current integrator 33 which consists of D.-C. motor 57 connected across resistor 58. The shaft speed of D.-C. motor 57 is proportional to the voltage drop across resistor 58 and hence is proportional to the plating current. Motor 57 drives cam 59 through a gear train. The angular position of cam 59 is therefore a function of the integral of the plating current. Since the mass of metal electroplating is a function of the plating current, the angular position of cam 59 also indicates the thickness of the plating on the electrodes.

With drum switch 35 in position #1, i.e., when the brushes are making contact with the segments, as shown in FIG. 5, the plating current is conducted through strips 76 and 77 to control units 22 and 21, connected in series, and then to ground through strips 78 and 79. It is to be noted that control units 21 and 22 are connected in series opposition, that is, when control unit 22 is plating cadmium on its inner electrode, control unit 21 is plating cadmium at the same rate on its outer electrode.

Initially motor 43, which controls the position of control unit 22, is connected to a source of voltage (not shown) of negative polarity with respect to ground, indicated as B— in FIG. 5, through strips 80 and 81, while motor 44, controlling the position of control unit 21, is connected to a source of voltage (not shown) of positive polarity with respect to ground, indicated as B+, through strips 82 and 83. Control unit 22 is therefore initially completely inserted into core 18 while control unit 21 is completely withdrawn. Motors 38 through 42, which individually control five shim rods, are initially connected to B— through strips 84 through 88 and 81. Therefore all of the shim rods are initially positioned in core 18. As previously described, motor 57 turns cam 59 through an angle proportional to the integral of the plating current. When this integral reaches a predetermined value, indicative of the substantially complete transfer of the cadmium plating to the inner electrode of the control unit positioned in the core, cam 59 closes contact 60. Step motor 36 is thereby connected to source 61 and rotates drum switch 35 to position #2. In this position control unit motor 43 is connected to B+ through strips 90 and 83 and shim rod motor 38 is also connected to B+ through strips 89 and 83. Control unit 22 and shim rod #1 are thereby removed from the core. Further, control unit motor 44 is connected to B— through strips 91 and 81. Control unit 21 is thereby inserted into the core. At this time control unit 21 has a predetermined maximum neutron absorbing efficiency while control unit 22 has a corresponding minimum neutron absorbing efficiency. Since control unit 21 is designed to be exactly equivalent to control unit 22 and shim rod 1, the power level of the reactor remains the same. Simultaneously the rotation of drum 35 reverses the connections to the electrodes of control units 21 and 22 by means of strip segments 92 and 93.

The above described switching operation is repeated each time the efficiency of the control unit positioned in the core falls to the predetermined minimum value as indicated by the position of cam 59. Each time step motor 36 rotates drum switch 35 to a new position a shim rod is removed, the control units are switched in position, and the electrical connections to the electrodes are reversed. When all the shim rods have been removed and the control unit in the core again has a minimum efficiency, drum switch 35 returns to position #1 and all of the shim rods are re-inserted into the reactor. This effectively shuts down the reactor permitting replenishment of the fuel.

Although the invention has been described and illustrated in detail, it is to be clearly understood that the same is by way of illustration and example only and is not to be taken by way of limitation, the spirit and scope of this invention being limited only by the terms of the appended claims.

We claim:
1. A control unit for controlling the reactivity of thermal nuclear reactors comprising a tubular electrode having a plating of cadmium on its inner surface, the thickness of said plating being less than .0075 inch; a second electrode positioned inside said tubular electrode, the surface area of said second electrode being substantially less than the inner surface area of said tubular electrode; an electrolytic solution of a cadmium salt between said electrodes; and an adjustable source of potential connected across said tubular electrode and said inner electrode whereby the plating rate of said cadmium is changed at a rate dependent on the magnitude of the output of said adjustable source of potential.

2. A control system for a thermal nuclear reactor, comprising a first control unit initially positioned within the effective neutron flux field of the core of said nuclear reactor, said control unit comprising a large surface area electrode, a small surface area electrode, a thin layer of cadmium plated on the surface of said large surface area electrode, said layer being of a predetermined thickness of less than the minimum black thickness for thermal neutrons of said good neutron absorbing material, and an electrolytic solution other than a fused salt solution of cadmium sulfate between said large and small electrodes; a second control unit constructed similar to said first-named control unit and initially positioned outside said effective neutron flux field; an adjustable source of potential connected across the control unit within said neutron flux field; means responsive to the deviation of the density of said flux field from a predetermined value for adjusting the potential output of said source of potential in a direction and of a magnitude to maintain the flux density of said field constant; a plurality of shim rods containing a neutron absorbing material initially positioned within said effective neutron flux field; means responsive to the thickness of said layer on said large electrode for indicating the neutron absorbing efficiency of said control units; means for inserting into said flux field the control unit positioned outside said flux field while simultaneously removing from said flux field one of said shim rods and the control unit positioned within said field whenever the neutron absorbing efficiency of said control unit within said flux field decreases to a predetermined level; an adjustable source of potential connected to the control unit outside said neutron flux field; and means for adjusting the output potential of said last-named source in a manner to replate a layer of said cadmium on the large area electrode of the control unit while positioned outside said flux field, said replated layer being substantially equivalent to its original predetermined thickness whereby the fine control over the power level of said nuclear reactor is accurately and continuously maintained.

References Cited in the file of this patent
UNITED STATES PATENTS

| | | |
|---|---|---|
| 2,373,352 | Smart | Apr. 10, 1945 |
| 2,431,948 | Martz | Dec. 2, 1947 |

OTHER REFERENCES

Nucleonics, October 1951, page 60.
Nucleonics, June 1953, pages 35–40.
Hampel: Rare Metals Handbook, Reinhold Publishing Corp. (1954), pages 71, 78, 333 and 345.
Mellor: A Comprehensive Treatise on Inorganic and Theoretical Chemistry, Longmans, Green and Co. (1926). vol. 5, pages 9, 575 and 576.
Davy: Philosophical Transactions of The Royal Society of London, vol. 99 (1809), pages 75 and 76.